United States Patent [19]

Futamura

[11] Patent Number: 4,736,656
[45] Date of Patent: Apr. 12, 1988

[54] EXTRUSION DIE AND MANUFACTURING METHOD OF SAME

[75] Inventor: Shoji Futamura, Kawasaki, Japan

[73] Assignee: Institute of Technology Precision Electrical Discharge Work's, Japan

[21] Appl. No.: 910,983

[22] Filed: Sep. 24, 1986

Related U.S. Application Data

[62] Division of Ser. No. 653,789, Sep. 21, 1984.

[30] Foreign Application Priority Data

Sep. 30, 1983 [JP]  Japan ................................ 58-182319
Jan. 13, 1984 [JP]  Japan .................................. 59-4595
Jan. 17, 1984 [JP]  Japan .................................. 59-6123

[51] Int. Cl.[4] .......................... B23P 15/24; B23H 7/06
[52] U.S. Cl. .................................. 76/107 R; 219/69 M
[58] Field of Search ............... 72/467, 260; 76/107 R, 76/107 A; 219/69 M

[56] References Cited

U.S. PATENT DOCUMENTS 2,341,749  2/1944  Webb .................................... 72/467
2,559,523  7/1951  Templin ............................. 72/467 X
4,036,043  7/1977  Yamaguchi et al. .............. 72/467 X

FOREIGN PATENT DOCUMENTS 78693   of 1950   Czechoslovakia ................ 76/107 R
16363   2/1979    Japan .................................. 76/107 R
141320  11/1980   Japan .

530796  12/1940   United Kingdom ............. 76/107 R

OTHER PUBLICATIONS

"Metallkunde", vol. 58, No. 4, 1967, pp. 215–217.
"Werkstatt und Betrieb" 108, 1975, pp. 499–505.

Primary Examiner—Roscoe V. Parker
Attorney, Agent, or Firm—McGlew and Tuttle

[57] ABSTRACT

An extrusion die having on the front surface thereof a bearing opening of the shape of a given section; a bearing surface corresponding to the section of the bearing opening formed over a length from the front surface to the rear surface of the die; and a draft formed from the bearing surface toward the rear surface; the bearing surface at each position on the inner circumferential line of the bearing opening being formed in such a fashion as to have a bearing length which is substantially determined in accordance with the shape of the bearing opening at that position wherein, when viewed with respect to a sectional face orthogonal to the inner circumferential line, a straight line corresponding to the bearing surface and a straight line corresponding to the draft intersect at a depth position substantially equal to or larger than the bearing length at that position, and the depth position where the intersection point exists is in a depth position which is substantially determined in accordance with the shape of the bearing opening at the respective positions on the inner circumferential line of the bearing opening, and a method of making the same.

7 Claims, 7 Drawing Sheets

EXTRUSION DIE AND MANUFACTURING METHOD OF SAME

This is a division of application Ser. No. 653,789 filed Sept. 21, 1984.

BACKGROUND OF THE INVENTION

1. Field of the Invention

This invention relates generally to an extrusion die and a method of making the same, and more specifically to an extrusion die having on the front surface thereof a bearing opening of the shape of a given section, and a draft formed over a length from the bearing opening toward the rear surface of the die wherein all or part of the bearing surface and the draft constituting the inner circumferential surface of the bearing opening are formed by means of the wire- gutting discharge machining equipment, and a method of making the same.

2. Description of the Prior Art

Figure 1A:
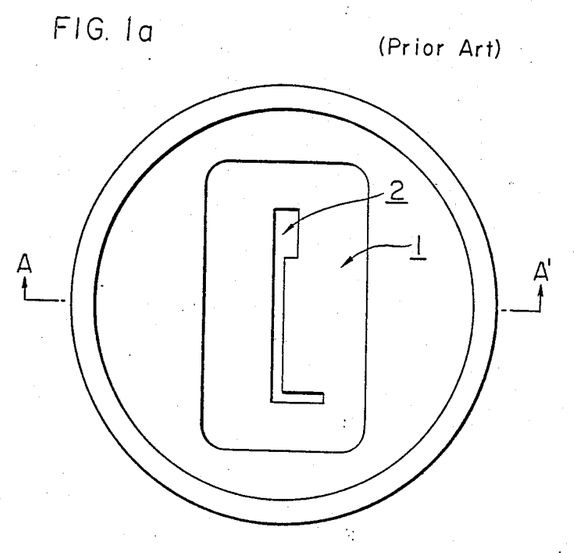
Figure 1B:
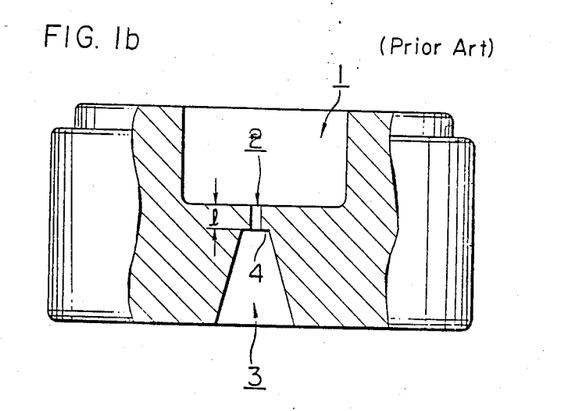
Figure 1C:
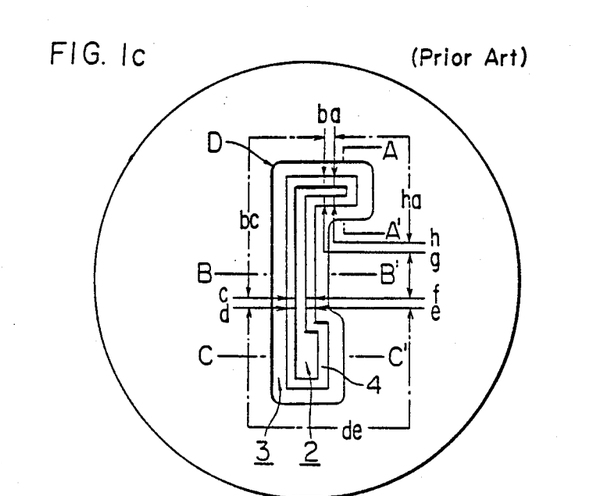

An extrusion die as illustrated in FIGS. 1 (A) through (C) is known as a conventional type of extrusion die for extruding aluminum extrusions. FIG. 1 (A) is a plan view, FIG. 1 (B) is a sectional side elevation taken along line A-A' in FIG. 1 (A), and FIG. 1 (C) is a bottom plan view of the conventional type of extrusion die, respectively. In the figures, reference numeral 1 refers to an entrance portion; 2 to a bearing opening; 3 to a draft; and 4 to a shouldered portion of the draft 3, respectively.

In general, when manufacturing an extrusion, like an aluminum sash, by forcing material through an extrusion die, an aluminum slug fed into the entrance portion 1 is forced toward the bearing opening 2 by means of an extrusion press (not shown), formed into a given shape by the bearing opening 2, and forced out of the draft 3 in the form of an extrusion. Consequently, to manufacture an extrusion with high precision, it is necessary to keep the rate of aluminum slug passing through the bearing opening 2 uniform. To achieve this, it has been conceived that the bearing length (1 as shown by arrows in FIG. 1 (B)) of the bearing opening 2 is adjusted in accordance with the shape of the bearing opening 2, as will be described later, referring to FIGS. 2 and 3. In the following, the bearing length 1 will be described.

Figure 2A:
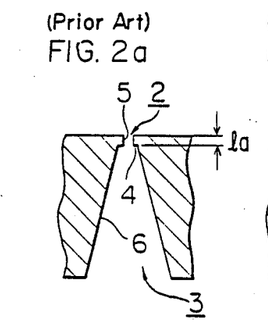
Figure 2B:
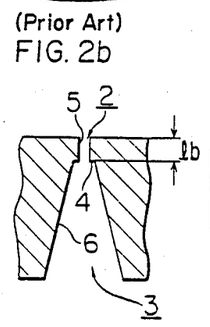
Figure 2C:
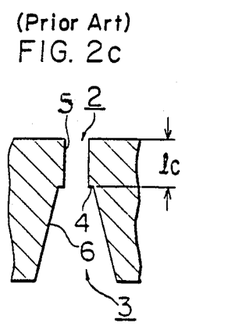
Figure 3:
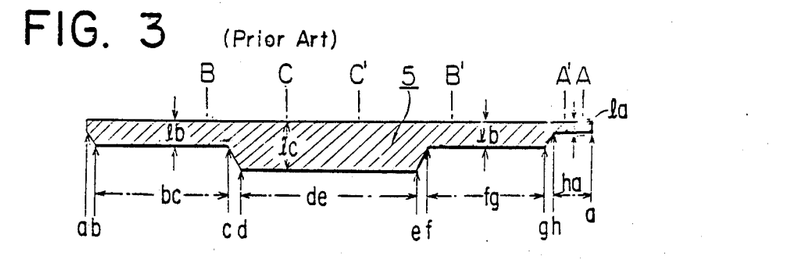

FIGS. 2 (A), (B) and (C) are crosssectional views taken along lines A-A', B-B' and C-C', respectively in FIG. 1, and FIG. 3 is a development of the bearing surface. Reference numerals 2 through 4 throughout the figures correspond with like numerals in FIG. 1, and 5 refers to a bearing surface and 6 to a draft tapered surface, respectively.

As noted earlier, the bearing length 1 (as shown in FIG. 1 (B)) in the bearing opening 2 is predetermined in accordance with the shape of the bearing opening 2. That is, the bearing length, $1_c$ is made larger, as shown in FIG. 2 (C), in a bearing opening portion having a larger width and the adjacent portions thereof, de is shown by arrows in FIG. 1 (C), while the bearing length, $1_b$ is made smaller, as shown in FIG. 2 (B), in bearing opening portions, bc and fg having a smaller width, as shown by arrows in FIG. 1 (C). Furthermore, the bearing length, $1_a$ is made further smaller, as shown in FIG. 2 (A), in a bearing opening end portion, ha as shown by arrows in FIG. 1 (C), which has the same width as the adjacent portions thereof but involves retarded metal flow. The bearing surface thus formed assumes a shape shows in FIG. 3 in a developed form. Arrows a through h in FIG. 3 correspond to the arrows a through h in FIG. 1 (C).

The bearing surface 5 of the bearing opening 2 in the conventional type of extrusion die described above is machined by the wire-cutting discharge machining equipment, while the draft shouldered portion 4 and the draft tapered surface 6 are machined by an ordinary discharge machining equipment, milling machine or other type of machine tool. The machining of the draft shouldered portion 4 is required because it is difficult to form with high precision the aforementioned bearing lengths $1_a$, $1_b$ and $1_c$, and the portions between ab, cd, ef and gh as shown in FIG. 3 merely by machining the bearing surface 5 and the draft tapered surface 6. As a result, the following problems are encountered in manufacturing an extrusion die of the conventionad type.

(i) Complex die manufacturing processes are needed, and the workpiece has to be positioned precisely in each manufacturing process.

(ii) As described above, the machining of the draft 3 with ordinary discharge machining equipment requires the manufacture of several types of machining electrodes, all of which have to be machined with high precision. The machining of the draft 3 with a milling machine also requires sophisticated machining techniques.

(iii) The high-prescision machining of an extrusion die of thc conventional type with the abovementioned machining methods is difficult because of electrode consumption in discharge machining, and because of cutter wobbling in milling.

Due to the aforementioned problems, the conventional type of extrusion die involves a large number of manhours and high manufacturing costs. Furthermore, provision of the draft shouldered portion 4 tends to decrease mechanical strength in the portions close to the bearing opening 2, leading to deformation and cracks in the thin-walled portions around the bearing opening 2.

SUMMARY OF THE INVENTION

It is an object of this invention to provide an extrusion die having an improved mechanical strength, which can be used for manufacturing extrusions with high precision, and can be manufactured with reduced manufacturing manhours and cost by automating all the machining operations of the bearing opening and draft thereof with the workpiece placed, through the operations, on the work table of a die manufacturing equipment combining wire-cutting discharge machining equipment and a milling machine, for example, and a method of making the same.

BRIEF DESCRIPTION OF THE DRAWINGS

FIGS. 1 through 3 are diagrams of assistance in explaining an extrusion die of the conventional type; FIG. 1 (A) being a plan view, FIG. 1 (B) being a sectional side elevation taken along line A-A' in FIG. 1 (A), FIG. 1 (C) being a bottom plan view, FIG. 2 (A) being a cross-sectional view taken along line A-A' in FIG. 1 (C), FIG. 2 (B) being a cross-sectional view taken along line B-B' in FIG. 1 (C), FIG. 2 (C) being a cross-sectional view taken along line C-C' in FIG. 1 (C), and FIG. 3 being a development of a bearing surface, respectively. FIGS. 4 (A) through (C) are diagrams of assistance in explaining an extrusion die embodying this invention, FIGS. 5 (A) through (C) are diagrams of assistance in explaining another embodiment of the extrusion die according to this invention.

DETAILED DESCRIPTION OF THE INVENTION

Each embodiment of the extrusion die of this invention will be described in the following, referring to FIGS. 4, 5 and 6. In the figures, reference numerals 2, 3, 5 and 6 correspond to like numerals in FIG. 2, and 7 to a notched portion. Each embodiment shown in FIGS. 4 through 6 is concerned with the extrusion die corresponding to the conventional type of extrusion die shown in FIGS. 1 through 3.

Figure 4A:
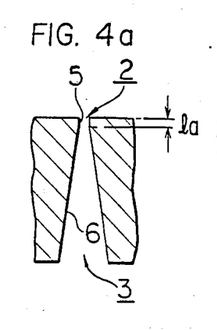
Figure 4B:
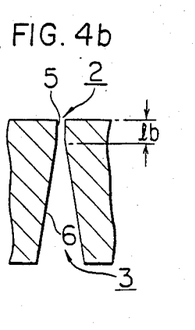
Figure 4C:
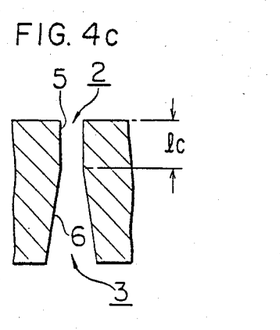
Figure 5A:
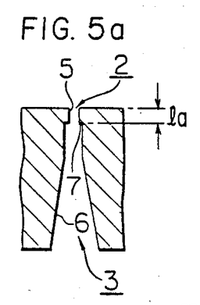
Figure 5B:
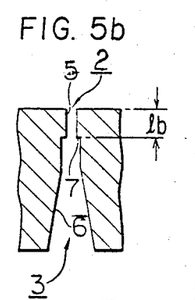
Figure 5C:
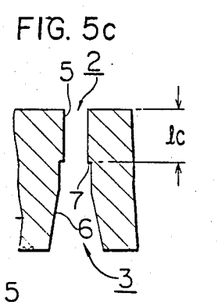
Figures 5D, 6:
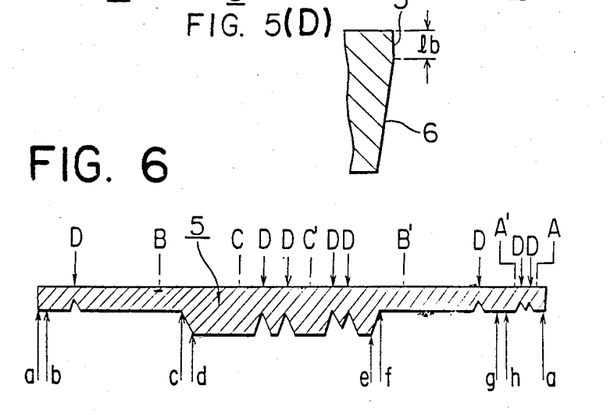
FIG. 6 is a further embodiment of the extrusion die of this invention.

FIGS. 4 (A), (B) and (C) are crosssectional views taken along lines A-A', B-B' and C-C' in FIG. 1 (C) illustrating the extrusion die of this invention, whose bearing surface 5 and draft tapered surface 6 are manufactured with the wire-cutting discharge machining equipment, which will be described later. The bearing surface 5 in the embodiment shown in FIG. 4 is machined in the same manner as with the conventional type of extrusion die. The draft tapered surface 6 constituting the draft 3 is also machined with the wire-cutting discharge machining equipment shown in FIG. 7, as will be described later, by controlling the inclination angle and/or travelling position of the wire electrode in accordance with the shape of the bearing opening 2 (the manufacturing method will be described in detail later). Consequently, the embodiment of this invention shown in FIG. 4 is an extrusion die having a bearing opening 2 defined by a desired bearing surface 5, as shown in the development shown in FIG. 3 without providing a draft shouldered portion 4 (shown in FIG. 2) as provided in the conventional type of extrusion die.

In the embodiment shown in FIG. 5, the bearing surface 5 having different bearing lengths (for example, $1_a$, $1_b$, $1_c$, etc. as shown by arrows in FIG. 3) at predetermined positions in accordance with the shape of the bearing opening 2 is formed by machining the draft tapered surface 6 while controlling the inclination angle and/or travelling position of the wire electrode so as to ensure the uniform flow rate of an aluminum slug passing through the bearing opening 2. The results of actual extrusion tests using the extrusion die thus manufactured, however, revealed that the bearing length of the bearing surface 5 has to be corrected in some cases. The amount of correction of the bearing length is usually so small that it can be corrected with a file. To do this, however, the intersection line of the bearing surface 5 and the draft tapered surface 6 has to be made visible. In the embodiment shown in FIG. 4, however, it is difficult to visually inspect the intersection line of the draft tapered surface 6 and the bearing surface 5 because of the small inclination angle of the draft tapered surface 6. Furthermore, when manufacturing extrusions using the extrusion die shown in FIG. 4, the extruded material may stick to the surface 6, depending on the nature of the material being extruded. This may cause flaws on the extrusion, leading to deteriorated product quality. As an extrusion die that can, solve the aforementioned problem, another embodiment of this invention will be described in the following, referring to FIG. 5.

The embodiment shown in FIG. 5 is an extrusion die in which, after the draft tapered surface 6 has been machined in the same manner as with the embodiment shown in FIG. 4, a notched portion 7 is provided within a range that can be visually inspected and corrected and can prevent the extrusion from sticking, that is, to a depth of 0.1 to 1.0 mm, for example, on the draft tapered surface 6 at the intersection line of the bearing surface 5 and the draft tapered surface 6, and thereafter the bearing surface 5 is formed in the same manner as with the embodiment shown in FIG. 4. (The manufacturing method thereof will be described later.) FIGS. 5 (A), (B), and (C) are cross-sectional views taken along lines A-A', B-B' and C-C' in FIG. 1 (C). FIG. 5,(D) is a cross-sectional view at a point D shown by an arrow in FIG. 1 (C) (a corner portion of the bearing opening). The bearing surface 5 of the embodiment shown in FIG. 5 can be developed as in the case of FIG. 3. The notched portion 7 is not provided at the corner portion of the bearing opening 2 in the embodiment shown in FIG. 5 (at a point D shown by an arrow in FIG. 1 (C)), as shown in FIG. 5 (D). This is partly because of the manufacturing method, which will be described later, and partly because the bearing surface 5 need not be corrected at the intersection line of the bearing surface 5 and the draft tapered surface 6 at the corner portion of the bearing opening 2. Furthermore, in view of the fact that a larger pushing force is exerted on the corner portion than on other portions, elimination of the notched portion leads to increased reinforcement of the corner portion to withstand the pushing force Now, still another embodiment of this invention will be described in what follows. In the embodiments shown in FIGS. 4 and 6, the depth positions of the intersection line of the bearing surface 5 and the draft tapered surface 6 from the front surface of the die agree with bearing lengths ($1_a$, $1_b$, and $1_c$ shown by arrows in FIGS. 4 and 5) at positions determined in advance in accordance with the shape of the bearing opening 2. This makes not only the control operation required for machining the draft tapered surface 6 complicated, but also the manufacturing process troublesome. Consequently, another embodiment of this invention (not shown), which has the same basic construction as the embodiment shown in FIG. 5, is constructed so that, after the draft tapered surface 6 has been machined in such a manner that the depth positions of the intersection line of the bearing surface 5 and the draft tapered surface 6 are made larger than the predetermined bearing lengths, or equal to the maximum value of the predetermined bearing lengths, the bearing surface 5 having the bearing lengths determined in accordance with the inner circumferential line of the bearing opening 2 is formed by the abovementioned notching operation. The extrusion die may have small bearing lengths at corners D, D,- - -, as shown in FIG. 6. FIG. 6 shows a development of the bearing surface 5 in another embodiment of this invention. The embodiment shown in FIG. 6 also has the bearing opening 2 of the same shape as the extrusion die of the conventional type shown in FIG. 1. The cross-sections taken at positions A-A' and B-B' correspond to FIG. 5 (B), and the cross-section taken at positions C-C' corresponds to FIG. 5(c). As is apparent from these crosssectional views, the embodiment shown in FIG. 6 has a similar construction as the embodiment shown in FIG. 5. As described earlier, the flow rate of an aluminum slug passing through the bearing opening 2 varies with the shape of the bearing opening 2, and decreases particularly at corner portions. Taking this fact in mind, the bearing lengths at corners D, D, - - - in the embodiment shown in FIG. 6 are made smaller than at other portions, as is apparent from the development shown in FIG. 6.

In the foregoing, extrusion dies embodying this invention have been described. Now, before describing the manufacturing method of these extrusion dies, the manufacturing equipment used for the manufacture of the extrusion die of this invention will be described, referring to FIG. 7.

Figure 7:
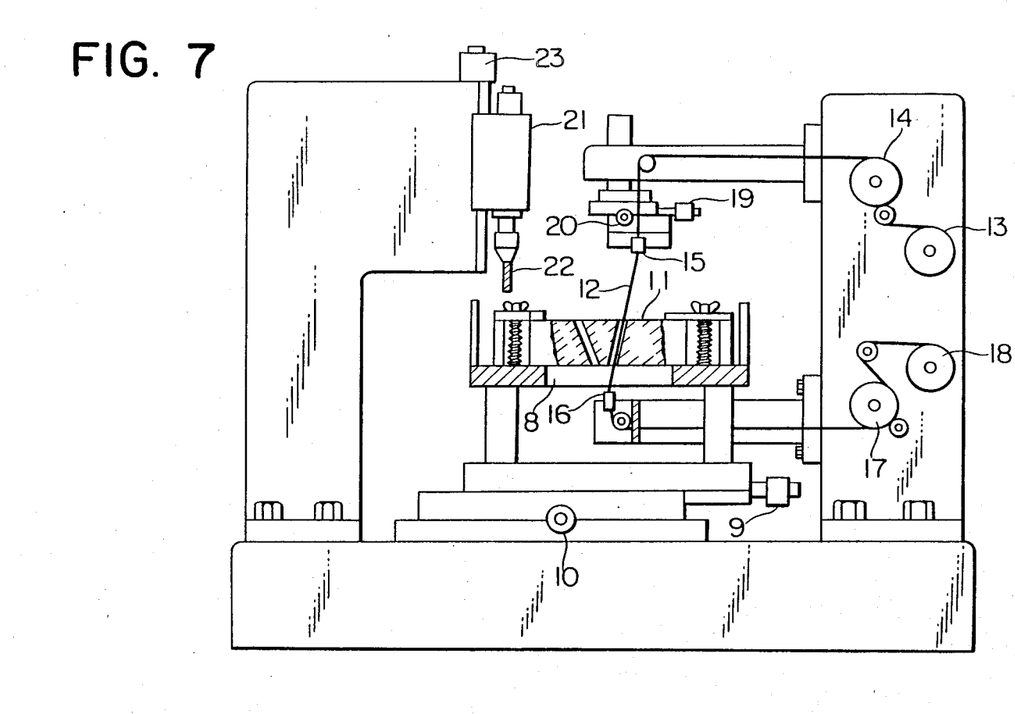
FIG. 7 shows an embodiment of the manufacturing equipment used for manufacturing the extrusion die of this invention, FIGS. 8 (A) through (E) are diagrams of assistance in explaining an embodiment of the manufacturing method of this invention.

In FIG. 7, reference numeral 8 refers to a work table; 9 and 10 to control motors for driving the work table 8 in orthogonally intersecting X and Y directions; 11 to a work piece; 12 to a wire electrode; 13 to a wire electrode feeding roller; 14 and 17 to tension rollers; 15 to an upper guide; 16 to a lower guide; 18 to a scrap roller; 19 and 20 to control motors for driving the upper guide 15 in orthogonally intersecting X and Y directions to adjust the inclination angle of the wire electrode 12; 21 to a cutter arbor; 22 to a milling cutter; 23 to a control motor for controlling the feed of the cutter arbor 21, respectively.

The manufacturing equipment shown in FIG. 7 is a combined wire-cutting discharge machining equipment and milling machine for manufacturing the extrusion die of this invention. Since the wire-cutting discharge machining equipment and the milling machine used are well known types, description of them will be made only briefly In FIG. 7, the work table 8 is driven in orthogonally intersecting lengthwise and widthwise directions by the control motors 9 and 10. The wire electrode 12 for cutting the workpiece 11 placed on the work table 8 is wound up by the scrap roller 18 via the wire electrode feeding roller 13, the lower guide 16, and the tension roller 17. The wire electrode 12 stretched between the upper guide 15 and the lower guide 16 is tensioned by the tension rollers 14 and 17 and caused to travel in a taut state. Since the upper guide 15 is constructed so as to be moved in orthogonally intersecting lengthwise and widthwise directions by the control motors 19 and 20, the inclination angle of the wire electrode 12 between the upper guide 15 and the lower guide 16 can be adjusted to any desired angle. Consequently, the work piece 11 on the work table 8 can be machined freely so long as linear cutting is concerned. Other machining operations (such as the machining of the notched portion as described earlier), which cannot be accomplished by the wire-cutting discharge machining equipment, can be achieved by performing desired milling operations by the use of the cutter arbor 21 set on the same bed, or by jig grinding operations by replacing the milling cutter 22 with a grinding wheel, through the control of the control motor 23 for controlling the feed of the milling cutter 22 and the control motors 9 and 10 for driving the work table in lengthwise and widthwise directions. In addition, discharge machining is also possible by replacing the cutter arbor with an ordinary discharge machining head (not shown).

The manufacturing equipment described above is capable of machining the workpiece in accordance with a predetermined program, or in a numerically controlled mode. In other words, the manufacturing equipment described above is capable of virtually automatically machining the bearing opening 2 and the draft 3 of the extrusion die of this invention. As the relative positions of the center of the milling cutter 22 and the wire electrode 12 are predetermined, it is possible to continuously and automatically perform wire-cutting discharge machining and milling operations. The abovementioned program may be considered as determined by the calculations performed based on the information on the shape of the bearing opening 2 being machined, the bearing length of the bearing surface 5, the inclination angle of the draft tapered surface 6, and the amount of notching of the notched portion 7. In the following, an example of the manufacturing method of the extrusion die of this invention will be described, referring to FIGS. 7 and 8.

The extrusion die of this invention as shown in FIGS. 4 through 6 is manufactured by machining in advance a die stock into a state before the machining of the bearing opening 2 and the draft 3, that is, a state where only the front surface, rear surface, recessed portion and outer circumferential surface of the extrusion die have been machined, as shown in FIG. 1 (in this Specification, the extrusion die machined in this state is called a workpiece). And then, the work piece 11 is heat treated and machined to form the bearing opening 2 and the draft 3 with the abovementioned manufacturing equipment.

Figure 8A:
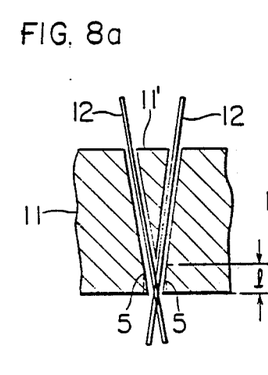
Figure 8B:
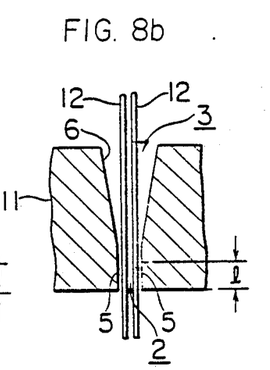
Figure 8C:
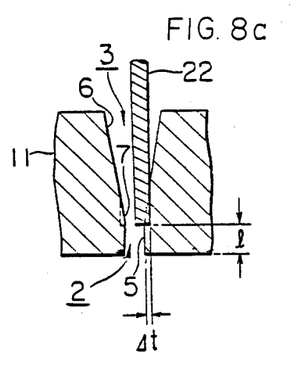
Figure 8D:
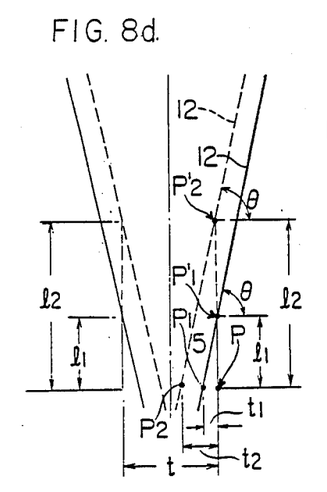
Figure 8E:
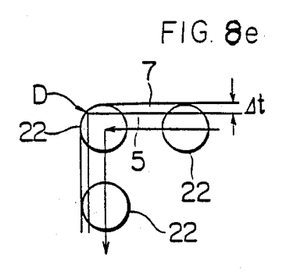

First, the machining method of the bearing opening 2 and the draft 3 in the embodiment shown in FIG. 4 will be described. The workpiece 11 is placed on the work table 8 in such a state that the front surface of the workpiece 11 comes in contact with the upper surface of the work table 8 of the manufacturing equipment shown in FIG. 7 (that is, a state where the bearing opening 2 being machined is directed downward, with the draft 3 faced upward, as shown in FIG. 8). Then, the workpiece 11 is cut by wire-cutting discharge machining while controlling the position and inclination angle of the wire electrode 12 with numerical control based on a predetermined program so that a machining allowance for the bearing surface 5 (as shown by dotted lines in FIG. 8 (A)). The program for numerical control is determined by calculations made based on the information on the shape of the bearing opening 2, the bearing length 1 of the bearing surface 5 at each position of the bearing opening 2, and the inclination angle of the draft tapered surface 6 at each position. FIG. 8 (D) shows an embodiment where the workpiece is NC-machined, with the inclination angle $\theta$ of the draft tapered surface 6 maintained constant. With this arrangement, therefore, any desired draft tapered surface 6 can be machined by controlling the position of the wire electrode 12. As the information on the shape of the bearing opening 2, for example, the coordinates of a point P corresponding to the bearing surface 5 being machined and a bearing length $1_l$ at each coordinate point are given. As a result, the coordinates of the position (a point $P_1$ shown by an arrow in the figure) of the wire electrode 12 corresponding to the point P can be obtained from the following expression.

$$t_1 = l_1 \cot \theta \qquad (1)$$

Thus, the wire electrode 12 is caused to pass over the desired intersection point (a point $P_1'$ as shown by an arrow in FIG. 8 (D)) of the bearing surface 5 and the draft tapered surface 6 by controlling the position of the wire electrode 12 based on the coordinates of the point $P_1$ obtained from Expression (1) above.

When the bearing length $l_2$ is given, the coordinates of a point $P_2$ shown by an arrow in the figure corresponding to the point P can be obtained from the following expression.

$$t_2 = l_2 \cot \theta \qquad (2)$$

By controlling the position of the wire electrode 12 based on the coordinates of the point $P_2$ obtained from Expression (2), the wire electrode 12 is caused to pass over the desired intersection point (a point $P_2'$ shown by an arrow in FIG. 8 (D)) of the bearing surface 5 and the draft tapered surface 6.

Although a machining control method when the inclination angle of the wire electrode 12 is set at a predetermined angle $\theta$ (the angle $\theta$ should preferably be within a range of 83° to 88°) has been described in the foregoing, the inclination angle $\theta$ may also be controlled together with the control of the position of the wire electrode.

In this way, the desired draft tapered surface 6 is formed by cutting the workpiece 11 to the shape of the bearing opening 2 with the wire electrode 12. Needless to say, a block 11' separated from the workpiece 11 is removed after this machining operation.

Next, the machining process of the bearing opening 2 will be described. This machining process may be performed after a small notched portion, which will be described later, has been formed, or before the draft 3 is machined. The bearing opening 2 is cut with the wire electrode 12 by positioning the wire electrode 12 vertical to the work table 8 (shown in FIG. 7), as shown in FIG. 8 (B), and controlling the position of the wire electrode 12 based on the coordinates (the coordinates of the point P shown by an arrow in FIG. 8 (D)) corresponding to the given shape of the bearing opening 2. With this cutting operation, the extrusion die shown in FIG. 4 where the bearing surface 5 and the draft tapered surface 6 intersect with each other at the positions (points $P_1'$ and $P_2'$ shown by arrows in FIG. 8 (D)) corresponding to the desired bearing lengths 1 on the inner circumferential surface (i.e., the bearing surface 5) of the bearing opening 2 can be manufactured.

Next, the manufacturing method of the embodiment shown in FIG. 5 will be described. The embodiment shown in FIG. 5 has a notched portion 7 (shown in FIG. 8 (C)) provided on the draft tapered surface 6 at the intersection line of the bearing surface 5 and the draft tapered surface 6 in the embodiment shown in FIG. 4. The notched portion 7 may be machined with the milling cutter 22 shown in FIG. 7 in a state where the extrusion die is kept placed on the work table 8 as it is after the draft tapered surface 6 described in the manufacturing method of the embodiment shown in FIG. 4 has been completed. After that, the bearing surface 5 may be machined on the workpiece 11. By machining in this sequence, burrs produced by the abovementioned notching operation can be removed. Since the information required for controlling the relative positions of the workpiece 11 and the milling cutter 22 during the notching operation, that is, the shape of the bearing opening 2 (the coordinates of the point P shown by an arrow in FIG. 8 (D)), the bearing lengths $l_a$, $l_b$, $l_c$, etc. as well as the information necessary for forming the notched portion 7 have been given, the desired notched portion 7 can be formed. The state of the relative movement of the milling cutter 22 and the workpiece 11 during the notching operation is shown in FIG. 8 (E). That is, the milling cutter 22 moves in the direction shown by an arrow line in the figure with respect to the workpiece 11. As is apparent from the figure, the tip of the milling cutter 22 moves along the corner portion D in such a manner that the cutter 22 comes in contact with the corner portion D. For this reason, the aforementioned notching operation is not performed on the corner portion D. In this way, the extrusion die shown in FIG. 5 is manufactured. In the description of the manufacturing method of the embodiment shown in FIG. 5, mention has been made that the draft tapered surface 6 is machined in the same manner as with the embodiment shown in FIG. 4. The bearing surface 5 having the predetermined bearing lengths (for example, $l_a$, $l_b$, $l_c$) at the positions as shown in FIG. 5 may be formed by the abovementioned notching operation after the draft tapered surface 6 at each position on the inner circumferential line of the bearing opening 2 has been machined to depth positions larger than the bearing lengths (for example, $l_a$, $l_b$, $l_c$, etc. shown in FIG. 5) or equal to the maximum value of the bearing length 1, with the inclination angle of the draft tapered surface 6 kept constant or not kept constant.

Furthermore, the extrusion die in the embodiment shown in FIG. 6 can be easily manufactured by combining the manufacturing processes of the embodiments shown in FIGS. 4 and 5. That is, the embodiment shown in FIG. 6 is essentially the same as the embodiment shown in FIG. 5, with the exception that the bearing length at the corner portion D of the bearing opening 2 is made smaller, as shown in the development showh in FIG. 6. The bearing surface at the corner portion D having the desired bearing length 1 by controlling the position and inclination angle $\theta$ of the wire-cutting electrode 12 since the bearing length 1 at the corner portion.D has been given in the machining process of the draft 3 in the embodiment shown in FIG. 4. In this way, the extrusion die in the embodiment shown in FIG. 6 can be manufactured.

In the above description of the manufacturing method of the extrusion die, mention has been made that the bearing surface 5 is machined with the wire-cutting discharge machining equipment. The bearing surface 5, however, may be machined with the aforementioned milling, jig grinding or ordinary discharge machining. Furthermore, the notching operation may be performed by the abovementioned milling, jig grinding or ordinary discharge machining.

Figure 9:
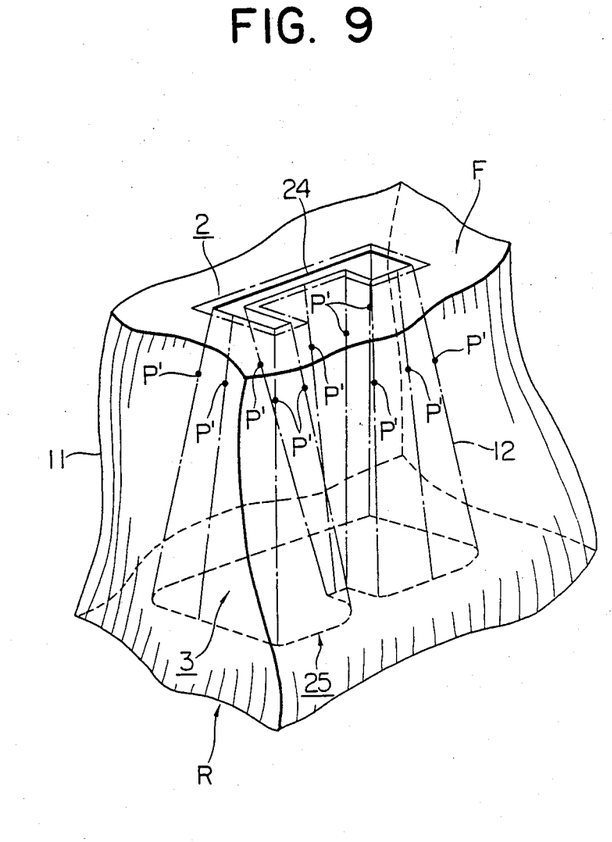
FIG. 9 is a diagram of assistance in explaining another embodiment of the manufacturing method of this invention.

FIG. 9 shows still another embodiment of the manufacturing method of the extrusion die according to this invention. In the embodiment shown in FIG. 9, the inclination angle of the wire electrode is capable of being controlled easily, and bearing surface machining and notching processes are performed in the same manner as in the manufacturing method described with reference to FIG. 8. In the figure, reference numeral 2 refers to a bearing opening; 3 to a draft; 11 to a workpiece; 12 to a wire electrode; 24 to a first profile; 25 to a second profile, respectively. Points represented by P', P'- - - indicate depth points (hereinafter referred to as bearing depth points) substantially equal to the bearing lengths (for example, $l_a$, $l_b$, $l_c$, etc. shown by arrows in FIG. 5) at each predetermined position corresponding to the shape of the bearing opening 2. The first profile 24 may be considered as a profile described on the die front surface (11-1 shown by an arrow in the figure) by the wire electrode 12 which passes the second profile 25 representing open profile of the draft 3 on the die rear surface (11-2 shown by an arrow in the figure) and the bearing depth points P', P'.

In the embodiment shown in FIG. 9, both the first and second profiles 24 and 25 are given, and pairs of two corresponding points are given on each of the profiles 24 and 25 to be followed by the wire electrode 12 at a predetermined angle to machine the workpiece 11. Needless to say, an NC machining technique is adopted in machining the workpiece 11. The first and second profiles 24 and 25, and the pairs of two corresponding points on both profiles are given as the information for NC machining so that the wire electrode 12 passes over the bearing depth points P', P', - - - as shown in FIG. 9 corresponding to the points $P_1'$, $P_2'$- - - shown in FIG. 8 (D). As described above, the manufacturing method shown in Fig. (9) permits the inclination angle and travelling position of the wire electrode 12 to be easily and accurately controlled during the machining of the draft 3. In the manufacturing method shown in Fig. (9), the machining of the bearing surface 5 and the notched portion 7 as described referring to FIGS. 8 (B) and (C) is performed after the draft tapered surface constituting the draft has been machined. Although mention has been made in describing the manufacturing method shown in Fig. (9) that the first and second profiles 24 and 25 are set on the die front surface F and the die rear surface R, this invention is not limited to this arrangement. That is, the first and second profiles 24 and 25 may be set at any given positiohs. Furthermore, in the manufacturing method described referring to FIG. 9, the first and second profiles 24 and 25 are set so that the wire electrode 12 passes over the bearing depth points P', P', - - - , the first and second profiles 24 and 25 may be set so that the wire electrode 12 passes over points (not shown) deeper than the bearing depth points P', P', - - - or equal to a maximum bearing depth point (for example, $l_c$ in the embodiment shown in FIG. 5). In this case, the bearing surface having predetermined bearing lengths is formed by the aforementioned notching operation after the draft tapered surface constituting the draft has been machined.

As described above, the manufacturing method of this invention makes it possible to manufacture the extrusion dies shown in FIGS. 4 through 6 by performing the entire machining process with the workpiece 11 placed on the work table 8, and to machine the workpiece 11 automatically with an NC machining technique. This enables the manufacture of extrusion dies with high precision at substantially reduced machining cost. In view of the fact that the performance of the wire-cutting discharge machining equipment in terms of machining rate has recently been substantially improved, the time required for the manufacture of the extrusion die of this invention, which relies on wire-cutting discharge machining for most of machining operations, can be substantially reduced compared with the conventional manufacturing processes.

Figure 10A:
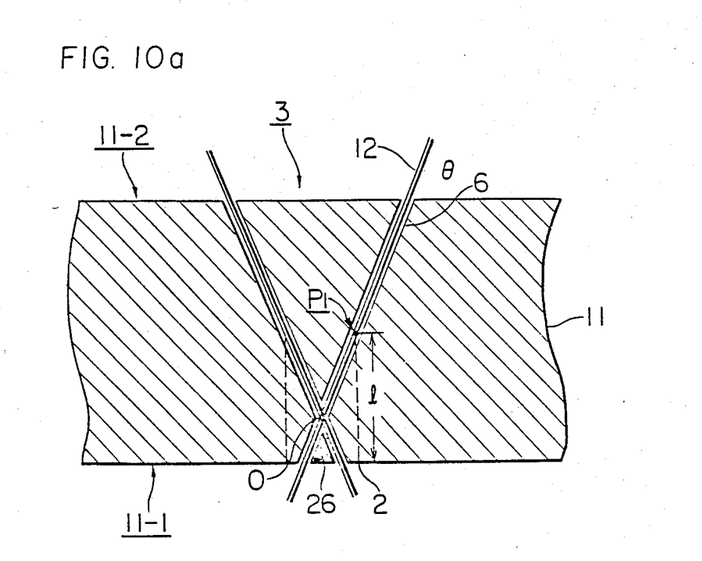
FIG. 10 is a diagram of assistance in explaining the mechanism for generation of separated fine metal chips during the manufacturing process of this invention.
Figure 10B:
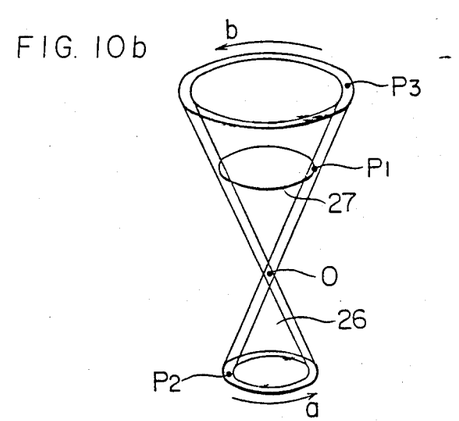

Depending on the shape of the bearing opening 2, the machining process of the draft 3 of the extrusion die using the manufacturing method of this invention may sometimes involve an unwanted phenomenon where fine metal chips (what is referred to as separated fine metal chips in this invention) are separated from the workpiece on the front surface of the extrusion die being machined. The formation of the separated fine metal chips is attributable to the factors which will be described later referring to FIG. 10, and may result in unstable wire-cutting discharge machining. This may pose an obstacle in automating the entire machining process since the separated fine metal chips have to be removed by interrupting the machining operation. The mechanism of the formation of separated fine metal chips will be described in the following, referring to FIG. 10. In the machining process of the draft 3 of the extrusion die, the wire electrode 12 inclined to an inclination angle $\theta$ corresponding to the inclination angle of the draft tapered surface 6 constituting the draft 3 is moved so as to pass over the point $P_1$ having a depth of the bearing length l at each position of the desired bearing opening 2, as shown in FIG. 10 (A). The trajectory of the travelling wire electrode 12 may sometimes intersect at a point O, as shown in the figure, depending on the value of the inclination angle $\theta$ of the wire electrode 12. FIG. 10 (B) is a diagram illustrating the trajectory of the wire electrode 12 during machining to facilitate the understanding of the state of machining of the draft 3. Where the intersection point O exists between the front surface 11-1 and the rear surface 11-2 of the workpiece 11, a separated fine metal chip 26 is generated on the rear surface 11-2, as shown in the figure. Reference numeral 27 in the figure refers to a trajectory of the point $P_1$; and arrow a to the direction of travel of the intersection point $P_2$ of the front surface 11-1 of the workpiece and the wire electrode 12; and arrow b to the direction of travel of the intersection point $P_3$ of the rear surface 11-2 of the workpiece 11 and the wire electrode 12.

The mechanism described above gives an explanation of the formation of the separated fine metal chip 26. The formation of the separated fine metal chip 26, however, can be prevented by setting the inclination angle $\theta$ of the wire electrode 12 to a larger value during the machining of the draft tapered surface 6 at portions where the separated fine metal chips are likely to be generated.

As described above, this invention makes it possible to provide an extrusion die which can be used for manufacturing extrusions with high precision and a method of making the same; and to substantially reduce the manufacturing manhours and cost and improve the mechanical strength of the die by automating the entire machining process of the bearing opening and the draft, with the workpiece placed on the work table of a manufacturing equipment combining the wire-cutting discharge machining equipment and the milling machine.

What is claimed is:

1. A method of manufacturing an extrusion die having a front and a rear surface, a bearing opening of the shape of a given section on said front surface, a bearing surface formed corresponding to said bearing opening from said front surface toward said rear surface and a draft formed from said bearing surface toward said rear surface, said bearing surface at a given position on the inner circumferential line of said bearing opening being formed so as to have a bearing length substantially determined in accordance with the shape of said bearing opening at said position, which method comprises;

placing a workpiece on a work table with one side corresponding to said rear surface of said die facing in a direction away from said work table;

feeding a wire electrode through said workpiece between a pair of guide members on opposite sides of said workpiece, at least one of said guide members being movable with respect to said workpiece, whereby said wire electrode can be positioned to travel through said workpiece in a direction inclined at a small angle with respect to the direction vertical to said front surface;

positioning said movable guide member so that at a given position on the inner circumferential line of said bearing opening said wire electrode passes over a depth position which is substantially equal to a bearing length corresponding to said given position; and removing material from said workpiece by wire-cutting discharge machining to form a draft having a surface tapered at a small angle with respect to the direction vertical to said front surface.

2. An extrusion die manufacturing method according to claim 1, wherein the position of said movable guide member is changed in order to controllably vary the inclination angle of said wire electrode at a position on the inner circumferential line of said bearing opening.

3. An extrusion die manufacturing method according to claim 1, wherein the surface tapered at a small angle of said draft is machined by giving profiles described by at least two points on said wire electrode separated by a distance in the longitudinal direction of said electrode so as to ensure that said wire electrode passes over said depth point at said given position.

4. An extrusion die manufacturing method according to claim 1, wherein the surface tapered at a small angle is notched at a depth position substantially equal to a bearing length corresponding to said position, after said surface tapered at a small angle has been machined.

5. A method of manufacturing an extrusion die having a front and a rear surface, a bearing opening of the shape of a given section on said front surface, a bearing surface formed corresponding to said bearing opening from said front surface toward said rear surface and a draft formed from said bearing surface toward said rear surface, said bearing surface at a given position on the inner circumferential line of said bearing opening being formed so as to have a bearing length substantially determined in accordance with the shape of said bearing opening at said position, which method comprises;

placing a workpiece on a work table with one side corresponding to said rear surface of said die facing in a direction away from said work tabe;

feeding a wire electrode through said workpiece between a pair of guide members on opposite sides of said workpiece, at least one of said guide members being movable with respect to said workpiece, whereby said wire electrode can be positioned to travel through said workpiece in a direction inclined at a small angle with respect to the direction vertical to said front surface;

positioning said movable guide member so that at least two given positions on the inner circumferential line of said bearing opening said wire electrode passes over at least two depth points larger than each of the bearing lengths corresponding to said positions;

removing material from said workpiece by wire-cutting discharge machining to form a draft having surfaces tapered at a small angle with respect to the direction vertial to said front surface; and notching said draft from said rear surface so that a bearing surface corresponding to said positions on the inner circumferential line of said bearing opening has a bearing length corresponding to said positions.

6. An extrusion die manufacturing method according to claim 5, wherein the position of the said movable guide memer is changed in order to controllably vary the inclination angle of said wire electrode at a position on the inner circumferential line of said bearing opening.

7. A method of manufacturing an extrusion die having a front and a rear surface, a bearing opening of the shape of a given section on said front surface, a bearing surface formed corresponding to said bearing opening from said front surface toward said rear surface and a draft formed from said bearing surface toward said rear surface, said bearing surface at a given position on the inner circumferential line of said bearing opening being formed so as to have a bearing length substantially determined in accordance with the shape of said bearing opening at said position, which method comprises;

placing a workpiece on a work table with one said corresponding to said rear surface of said die facing in a direction away from said work table;

feeding a wire electrode through said workpiece in a direction inclined at a small angle with respect to the direction vertical to said front surface;

positioning said wire electrode so that at a given position on the inner circumferential line of said bearing opening said wire electrode passes over a depth position which is substantially equal to a bearing length corresponding to said given position; and removing material from said workpiece by wire-cutting discharge machining to form said draft.

* * * * *